United States Patent [19]

Brax

[11] 3,999,972
[45] Dec. 28, 1976

[54] FOREHEARTH FOR GLASS FURNACE

[75] Inventor: Jean Albert Brax, Chalon-sur-Saone, France

[73] Assignee: Societe Generale pour l'Emballage, Paris Cedex, France

[22] Filed: Aug. 25, 1975

[21] Appl. No.: 607,707

Related U.S. Application Data

[63] Continuation of Ser. No. 448,676, March 6, 1974, abandoned.

[30] Foreign Application Priority Data

Mar. 6, 1973 France .............................. 73.07957

[52] U.S. Cl. .................................. 65/337; 65/346; 65/356
[51] Int. Cl.² .......................................... C03B 5/16
[58] Field of Search .......................... 65/134–137, 65/337, 346, 347, 356

[56] References Cited

UNITED STATES PATENTS

| | | | |
|---|---|---|---|
| 1,554,268 | 9/1925 | Ferngren | 65/346 X |
| 1,900,361 | 3/1933 | Mulholland et al. | 65/346 |

*Primary Examiner*—Robert L. Lindsay, Jr.
*Attorney, Agent, or Firm*—Pennie & Edmonds

[57] ABSTRACT

A forehearth for a glass furnace includes a roof having a plurality of longitudinal ridges depending therefrom. These define a central longitudinal channel lengthwise of which a current of cooling air flows between inlet and outlet ports to cool the central, hottest portion of the current of glass in the forehearth, and side channels which, optionally with burners or heaters, serve to reheat the portions of the glass current at the longitudinal edges of that current.

1 Claim, 7 Drawing Figures

FOREHEARTH FOR GLASS FURNACE

This is a continuation of application Ser. No. 448,676 filed Mar. 6, 1974, now abandoned.

The present invention pertains to a method and apparatus for cooling and conditioning glass to achieve a flowing stream of glass of improved temperature homogeneity over the cross-section of the stream. The invention thus pertains to forehearths for the distribution or delivery of molten glass, e.g. for delivery to feeders which in turn deliver gobs of glass to forming machines, and more particularly to a forehearth providing improved homogeneity in the temperature of the glass therein.

The high production rates which have been achieved in recent years in the manufacture of glass articles on automatic forming machines receiving glass from forehearths has entailed a rise in the temperature of the glass flowing through those forehearths and an increase in the temperature gradients across the channels of those forehearths. The present invention therefore pertains to control of the temperature of melted glass in such forehearths and, more particularly to homogenization of the temperature of the glass, in the current flowing through the forehearth, over sections transverse of the direction of flow of that current.

It is known that in a forehearth there exists a temperature gradient between the middle or center of the molten glass current and the edges thereof. These temperature differences may amount to several tens of degrees at the outlet or feeder end of the forehearth. These differences of course are accompanied by differences in glass viscosity, which in turn result in substantial variation in the physical and chemical properties of the pieces, i.e. of the ware, manufactured from such glass.

It is an object of the present invention to surmount this disadvantage by providing a forehearth having means to homogenize the temperature of the molten glass flowing through the forehearth, so as to reduce the temperature difference between the center portion of the glass current and the edge portions thereof.

According to one feature of the invention, instead of effecting a transverse ventilation of the forehearth as has usually been common practice, there is effected a longitudinal ventilation thereof, by means of a gas flow parallel to the longitudinal axis of the forehearth and concentrated over or along the middle thereof, so as preferentially to chill the central portion of the glass current, which is at the highest temperature.

According to another feature of the invention, the roof or crown of the forehearth has formed therein two downwardly extending longitudinal ridges, disposed essentially symmetrically of the longitudinal vertical median plane of the forehearth. These ridges serve, with the remainder of the roof, to define three longitudinal compartments in the space above the glass current. Of these, the central one serves to guide and concentrate the longitudinal gas flow just described. The two lateral compartments promote a local convection of hot gases to reheat the glass at the edges of the current of glass, especially in forehearths equipped with lateral burners.

Advantageously these burners may be supplemented by other heating means such as electric resistances or burners disposed laterally in cavities in the floor or trough portion of the forehearth, to reheat the glass which flows along the edges of the glass current in the trough.

BRIEF DESCRIPTION OF THE DRAWINGS

The invention will now be further described in terms of a number of presently preferred exemplary embodiments and with reference to the accompanying drawings in which.

DESCRIPTION OF PREFERRED EMBODIMENTS

Figure 1:
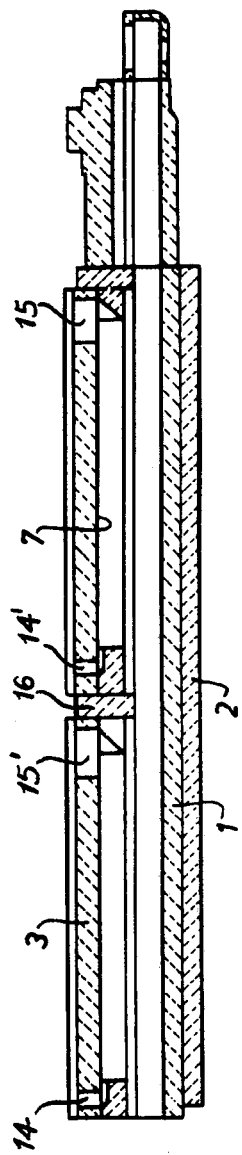
FIG. 1 is a schematic longitudinal axial section through a forehearth according to the invention.
Figure 2:
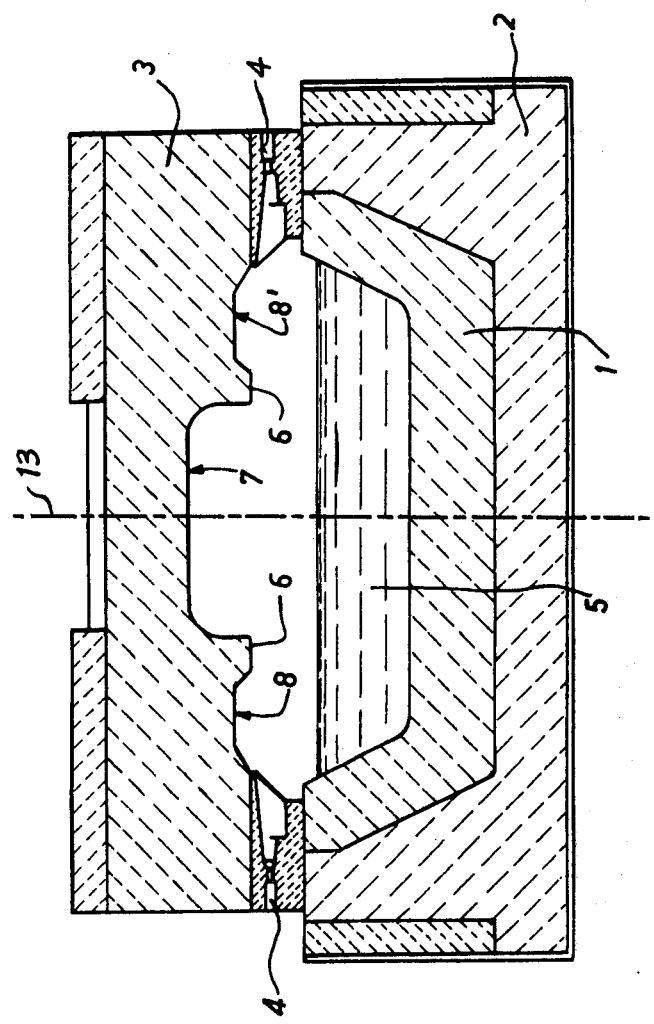
FIG. 2 is a transverse section of the forehearth of FIG. 1 at an enlarged scale.

Referring first to FIGS. 1 and 2, a forehearth according to the invention is there shown as including a trough 1, thermally insulated from the outside by a refractory insulating layer 2, and a vault or roof 3. This roof is provided on opposite sides of the trough, in a manner know per se, with burners or burner nozzles 4, serving to reheat the portions of the melted glass 5 which are closest to the lateral edges of the flow channel defined by the trough 1.

In accordance with the invention, the forehearth is ventilated longitudinally by means of a current of air directed over and along the central portion of the flow channel, in order to chill the glass therein which is at a higher temperature than glass along the sides of the channel.

The roof is apertured at longitudinally spaced locations 14 and 15 for the entrance and exhaust of the air or other gas by means of which this ventilation is effected. As indicated in FIG. 1, the forehearth may include a transverse bridge 16 extending part-way down from the roof toward the glass and effecting a partial division of the space above the glass into upstream and downstream sections. In such a construction, additional similar apertures 14' and 15' may be provided immediately downstream and upstream of the bridge 16 to permit operation of one ventilation current between apertures 14 and 15' and another between apertures 14' amd 15.

In order to guide the air current, the roof 3 comprises two ridges 6 which extend downwardly toward the glass and longitudinally of the forehearth. The two ridges are disposed substantially symmetrically with respect to the longitudinal vertical median plane of the forehearth, indicated at 13 in FIG. 2 (and also in FIGS. 3 and 4), this being the section plane of FIG. 1. On the drawing, the ridges 6 are schematically shown as being integral with the remainder of the roof. They may of course however advantageously be made up separately, of refractory material like the remainder of the roof, and affixed thereto.

The ridges 6 divide the roof into three portions, defining longitudinal compartments or channels 7, 8 and 8' in the space above the glass in trough 1 and beneath the roof. The compartment 7, to which the apertures 14, 14', 15 and 15' of FIG. 1 give access, is located over the center portion of trough 1 and hence over the center portion of the glass current flowing longitudinally of that trough. It thus guides and concentrates over the hottest, central portion of the glass current the longitudinal current of ventilating and cooling air or other gas. The lateral compartments 8 and 8' promote convection currents, in essentially circular paths in planes parallel to that of FIG. 2, to reheat the edge portions of the glass. As indicated hereinabove, it may be advantageous to supplement, or to replace the heating means 4 of FIG. 2, with heating means disposed in the floor of the forehearth, adjacent to the side walls of the trough 1. Such heating means may for example take the form of electrical resistance heaters 9 disposed in cavities 10 of the trough 1 as indicated in FIG. 3, or they may take the form of burners 11, disposed in lateral cavities 12 as illustrated in FIG. 4.

Figure 5:
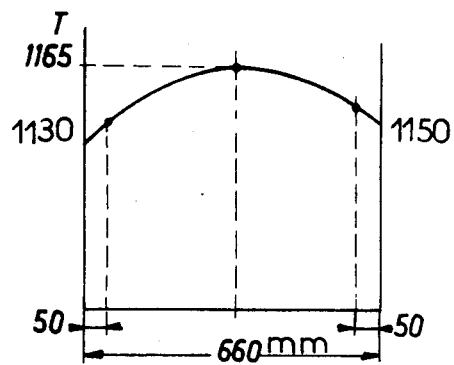
FIGS. 5, 6 and 7 are curves representing the transverse temperature variation of the melted glass flowing in a forehearth of the prior art, in a forehearth according to the invention but without reheating at the edges or margins, and in a forehearth according to the invention including such reheating, respectively.
Figure 6:
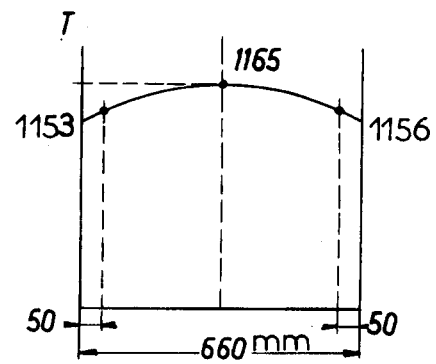
Figure 7:
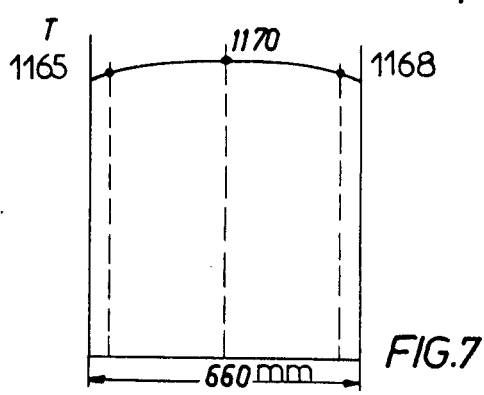

FIGS. 5, 6 and 7 illustrate the advantages of the invention. All three pertain to forehearths having a trough 7.5 meters long and 660 millimeters wide at the top operated with a throughput of 40 tons of glass per day. In FIGS. 5 to 7, the horizontal axis represents position crosswise of the forehearth channel. The vertical axis is temperature in degrees centigrade. These figures thus constitute plots of glass temperature crosswise of three different forehearths as hereinabove described and as set forth in the brief description of the drawing. The temperatures are those observed half-way between the upstream and downstream ends of the forehearths.

For the forehearth of the prior art having transverse ventilation and not including in its roof the ridges of the invention, and for which the data are plotted in FIG. 5, the glass temperature at the upstream end is of the order of 1250° C. At the outlet from the channel, at the downstream end of the forehearth, the glass temperatures are between 1120° and 1050° C. From FIG. 5 it will be seen that, half-way down from the upstream end to the downstream end, the temperatures are 1165° C. at the center, i.e. in midstream, 1130° C. at one bank (on the side where the cooling air enters), and 1150° C. at the opposite bank or edge of the glass current.

Figures 3, 4:
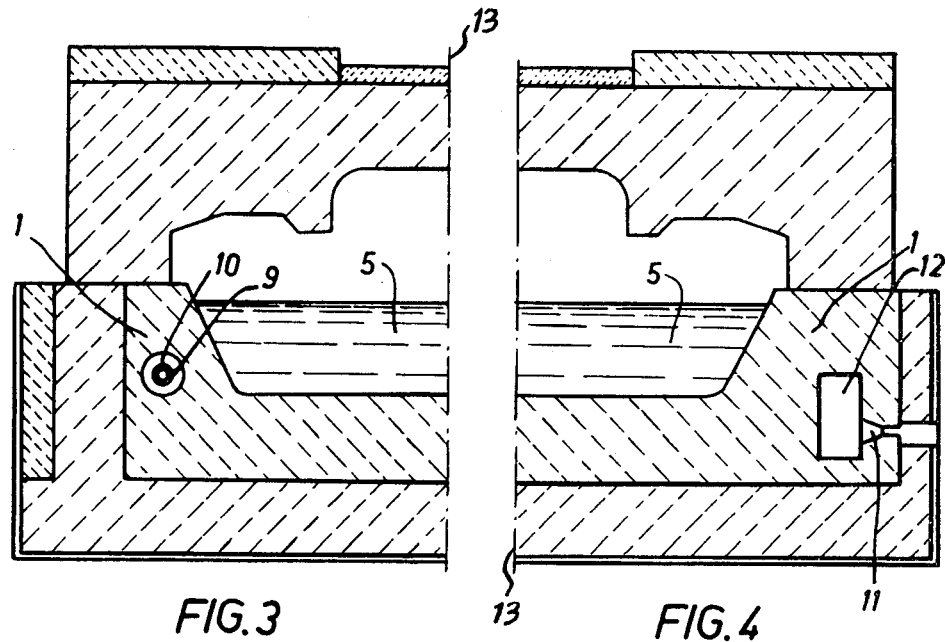
FIGS. 3 and 4 are half transverse sections similar to that of FIG. 2 but showing modified forehearths according to the invention.

For a forehearth according to the invention, i.e as illustrated in FIGS. 1 and 2, with longitudinal ventilation but without the use of heating means at the edges of the trough such as the means 4, 9 and 11 of FIGS. 2, 3 and 4, the data are plotted in FIG. 6. The temperature in midstream is about 1165° C. and that at the edges is about 1155° C., the flow of air being 50 m³/n per meter of length of the channel.

Lastly, for the forehearth of the invention, i.e. as illustrated in FIGS. 1 and 2, with the same longitudinal ventilation and with heat (4m³/n of natural gas per meter of length) supplied to the edges of the trough, the temperature at the center of the glass current, in midstream, is 1170° C. and at the banks it is 1165° C. at one side and 1168° C. at the other.

FIG. 6 shows that the forehearth of the invention greatly reduces the variation in temperature across the glass flow channel, even without use of edge-reheating means. FIG. 7 shows that the transverse temperature gradient has been substantially suppressed in the forehearth of the invention when such edgeheating means are employed.

As above indicated, this homogenization of the glass temperature has the beneficial effect of likewise homogenizing the physical properties of glassware made from glass cooled and conditioned in the forehearth of the invention. In order better to show the advantageous operation of the invention, applicant's assignee has carried out comparative tests on the homogeneity of glass taken from the downstream end of the three forehearths from which the data presented in FIGS. 5, 6 and 7 were derived.

In order to express quantitatively the homogeneity of the glass, the stresses in various zones of reheated glass test pieces or samples were measured by optical methods. To this end, there was employed a Babinet compensator which collects polarized light passing through the sample. The samples were in the form of rings one centimeter in height, cut from bottles made of the glasses under investigation. To eliminate the residual stresses of reheating, the rings were opened. The observations were made from the edge of the sample. The criteria of homogeneity employed were the maxiumum extension in the outer surface of the ring, and the maximum absolute adjacent tensions or stresses in the samples. The results are expressed in millimeters of deviation of the Babinet compensator. In the apparatus used in the tests being described, one millimeter of deviation corresponded to an optical retardation of 113 millimicrons per centimeter of thickness, i.e. to a tension of 45 kilograms per square centimeter.

The tests gave the following results:

1. For glass taken from the prior art forehearth described in connection with and from which the data given in FIG. 5 were derived:
   a. on the exterior surface:
      extension of 0.35 millimeters (40 millimicrons of optical retardation);
      Compression of 0.60 millimeters (68 millimicrons of optical retardation);
   b. absolute maxima:
      extension of 0.60 millimeters (68 millimicrons) and compression of 0.75 millimeters (85 millimicrons of optical retardation);
      absolute contiguities of 1.4 millimeters (158 millimicrons of optical retardation).

These values represent the degree of homogeneity consistent with commercial quality glassware.

2. For glass taken from the forehearth according to the invention described in connection with and from which the data given in FIG. 6 were derived:
   a. on the exterior surface:
      extension of 0.20 millimeters (23 millimicrons of optical retardation);
      compression of 0.30 millimeters (34 millimicrons of optical retardation);
   b. absolute maxima:
      extension of 0.3 millimeters (34 millimicrons of optical retardation);
      compression of 0.40 millimeters (45 millimicrons of optical retardation);
      absolute contiguities of 0.70 millimeters (79 millimicrons of optical retardation).

This degree of homogeneity is likewise that of commercial glassware.

3. For glass taken from the forehearth of the invention described in connection with and from which the data given in FIG. 7 were derived:
   a. on the exterior surface:
      extension of 0.0 millimeters;
      compression of 0.2 millimeters (22 millimicrons of optical retardation);
   b. absolute maxima:
      extension of 0.0 millimeters;
      compression of 0.20 millimeters (22 millimicrons of optical retardation);

absolute contiguities of 0.20 millimeters (23 millimicrons of optical retardation).

This degree homogeneity is considered to be complete or substantially perfect from the commercial point of view.

These results show the high degree of homogeneity obtained in articles made from glass which while in the molten states was passed through forehearths according to the invention.

It will thus be seen that the invention provides a method of cooling and conditioning molten glass which comprises flowing the glass in a longitudinal stream, e.g. as shown at 5 in FIG. 2, directing a current of gas above and longitudinally of the stream of glass, and concentrating the current of gas over the central portion of the stream of glass. The method of the invention advantageously includes the further step of applying heat to the edge portions of the glass stream. In its apparatus aspect, the invention provides apparatus for the conveyance of glass comprising a trough, a roof over the trough, and means to cause a current of gas to flow beneath the roof longitudinally of the trough over the central part thereof, in order preferentially to cool the central portion of a current or stream of glass flowing longitudinally of the trough. This apparatus desirably includes means to apply heat to the edges of the trough. The apparatus of the invention is typically a forehearth, including a trough and a roof over the trough, with inlet and outlet apertures spaced longitudinally of the roof for ingress and egress of the gas current. To concentrate the gas current over the central portion of the trough longitudinal ridges are provided, depending from the roof, and there may be provided means to heat the edge portions of a stream of glass flowing lengthwise of the trough, for example by burners as shown at 4 in FIG. 2 which heat the edge portions of the glass stream directly, or by heating means as shown at 9 and 11 in FIGS. 3 and 4 to heat the side walls of the trough.

While the invention has been described hereinabove in terms of a number of presently preferred embodiments of the apparatus thereof, and in terms of presently preferred modes of practice of the method thereof, the invention itself is not limited thereto but rather comprehends all modifications of and departures from those embodiments and modes properly falling within the scope of the appended claims.

I claim:

1. A forehearth for the conveyance of molten glass which comprises a trough and a roof over the trough, said roof having at least two longitudinal ridges extending downwardly from the roof and disposed substantially symmetrically on opposite sides of the vertical median plane of the trough to define in the space below the roof a central channel over the central portion of a stream of molten glass flowing through the trough and side channels on respective sides of the central channel over respective side portions of the stream of glass, longitudinally spaced inlet and outlet apertures in the roof over said central channel for the ingress and egress of a gaseous cooling fluid whereby the fluid flows over the central portion of the stream of molten glass in contact with the upper surface of the stream, the portion of said roof over said central channel between said apertures being substantially closed, and means disposed along the sides of said trough for applying heat to the side portions of the stream of glass.

* * * * *